US008506016B2

(12) United States Patent
Mizobata (10) Patent No.: US 8,506,016 B2
(45) Date of Patent: Aug. 13, 2013

(54) VEHICLE SEAT

(75) Inventor: Hiroshi Mizobata, Seto (JP)

(73) Assignee: Toyota Boshoku Kabushiki Kaisha, Aichen-Ken (JP)

( * ) Notice: Subject to any disclaimer, the term of this patent is extended or adjusted under 35 U.S.C. 154(b) by 35 days.

(21) Appl. No.: 13/152,709

(22) Filed: Jun. 3, 2011

(65) Prior Publication Data

US 2011/0298269 A1  Dec. 8, 2011

(30) Foreign Application Priority Data

Jun. 8, 2010  (JP) ................................. 2010-131145

(51) Int. Cl.
*B60N 2/68* (2006.01)

(52) U.S. Cl.
USPC ................................. 297/452.18; 297/452.56

(58) Field of Classification Search
USPC . 297/452.18, 452.56, 452.55, 452.49–452.53
See application file for complete search history.

(56) References Cited

U.S. PATENT DOCUMENTS

| | | | |
|---|---|---|---|
| 3,375,861 A * | 4/1968 | Marlow | 160/371 |
| 4,702,522 A * | 10/1987 | Vail et al. | 297/452.56 |
| 5,954,403 A * | 9/1999 | Mock et al. | 297/452.18 |
| 6,059,369 A * | 5/2000 | Bateson et al. | 297/452.18 |
| 6,213,488 B1 * | 4/2001 | Filice et al. | 280/281.1 |
| 7,090,300 B2 * | 8/2006 | Fujita | 297/452.49 |
| 7,416,256 B2 * | 8/2008 | Fujita et al. | 297/452.56 |
| 7,503,627 B2 * | 3/2009 | Kawasaki | 297/452.56 |
| 7,850,247 B2 * | 12/2010 | Stauske et al. | 297/452.38 |
| 2003/0001422 A1 * | 1/2003 | Toyota et al. | 297/452.18 |
| 2003/0020319 A1 * | 1/2003 | Adams et al. | 297/452.18 |
| 2003/0122413 A1 * | 7/2003 | Cramb et al. | 297/452.56 |
| 2003/0193231 A1 * | 10/2003 | Fujita et al. | 297/452.56 |
| 2004/0130202 A1 | 7/2004 | Kawasaki | |
| 2009/0179477 A1 * | 7/2009 | Yamazaki et al. | 297/452.18 |
| 2009/0302662 A1 * | 12/2009 | Groelsma et al. | 297/452.18 |
| 2010/0201178 A1 | 8/2010 | Mizobata | |
| 2010/0259089 A1 | 10/2010 | Mizobata et al. | |

(Continued)

FOREIGN PATENT DOCUMENTS

| | | |
|---|---|---|
| JP | 2-257912 | 10/1990 |
| JP | 11-266961 | 10/1999 |

(Continued)

OTHER PUBLICATIONS

U.S. Appl. No. 13/118,987 to Hiroshi Mizobata, filed May 31, 2011.
China Office action, dated Jan. 25, 2013 along with an english translation thereof.

*Primary Examiner* — David Dunn
*Assistant Examiner* — Alexander Harrison
(74) *Attorney, Agent, or Firm* — Greenblum & Bernstein, P.L.C.

(57) ABSTRACT

A support member has a sheet-shaped body that expands and contracts and that supports a cushion, and a frame-shaped body that fixes the sheet-shaped body in a tensioned state. The sheet-shaped body is attached to a frame member by the frame-shaped body being engaged with the frame member. The frame-shaped body is rigid and maintains a shape that follows an outer shape of the frame member when an occupant is seated, and has a first portion where an end portion of the sheet-shaped body is fixed, and a second portion where the end portion of the sheet-shaped body is not fixed. The second portion is formed at a position that corresponds to a position where a load of the occupant concentrates when the occupant is seated.

6 Claims, 5 Drawing Sheets

(56) References Cited

U.S. PATENT DOCUMENTS

| | | | |
|---|---|---|---|
| 2011/0148173 A1* | 6/2011 | Westerink et al. | 297/452.18 |
| 2012/0019039 A1* | 1/2012 | Hara et al. | 297/452.18 |
| 2012/0049604 A1* | 3/2012 | Ellison | 297/452.18 |
| 2012/0193965 A1* | 8/2012 | Saveski et al. | 297/452.18 |
| 2012/0217775 A1* | 8/2012 | Fujita et al. | 297/216.13 |

FOREIGN PATENT DOCUMENTS

| | | |
|---|---|---|
| JP | 2003-79473 | 3/2003 |
| JP | 2003-116663 | 4/2003 |
| JP | 2005-328858 | 12/2005 |
| JP | 2010-23703 | 2/2010 |
| JP | 2010-131145 | 6/2010 |

* cited by examiner

VEHICLE SEAT

INCORPORATION BY REFERENCE

The disclosure of Japanese Patent Application No. 2010-131145 filed on Jun. 8, 2010 including the specification, drawings and abstract is incorporated herein by reference in its entirety.

BACKGROUND OF THE INVENTION

1. Field of the Invention

The invention relates to a vehicle seat that has a frame member, a cushion, and a support member (i.e., a member that supports the cushion on the frame member).

2. Description of the Related Art

Japanese Patent Application Publication No. 2005-328858 (JP-A-2005-328858) describes one such vehicle seat. This vehicle seat has a seat cushion and a seat back. The seat cushion has a frame member that forms a seat frame, a cushion that forms the outer shape of the seat, and a support member. The support member is a member that supports the cushion on the frame member, and includes a sheet-shaped body and hook members. The sheet-shaped body is a member that is able to elastically support the cushion, and may be formed by three-dimensional knit fabric, for example. Also, the hook members are resin members having a generally J-shaped cross section, and can be sewn an end portion of the support member. With this related art, the hook members are engaged with (i.e., hooked onto) the frame member, while the sheet-shaped body is arranged on the frame member (i.e., the support member is arranged on the frame member). Next, the cushion is arranged on the support member. Thus, the cushion is able to be arranged on the frame member via the support member.

Incidentally, in this related art, taking into account the sittability of the seat, the hook members are engaged with the frame member while the sheet-shaped body is under tension. As a result, with the structure of the related art, excessive tension placed on the sheet-shaped body from an occupant sitting down may feel odd or uncomfortable to the occupant (the occupant may feel as if his or her rear (buttocks) has hit the bottom of the seat, for example). Also, the structure of the related art is such that if there is variation in the engaging states of the hook members, the tension will tend to become uneven, with the sheet-shaped body sagging in some parts. Therefore, extra attention must be paid when engaging the hook members and the like, so workability is reduced.

SUMMARY OF THE INVENTION

The invention provides technology for attaching a support member to a frame member with good workability, while maintaining good sittability as much as possible.

One aspect of the invention relates to a vehicle seat provided with a seat structure member such as a seat cushion or a seat back. The seat structure member has a frame member that forms a seat frame, a cushion that forms a seat outer shape and elastically supports an occupant, and a support member. The seat cushion is attached to the frame member via this support member. With this type of seat structure, it is desirable to be able to attach the cushion to the frame member via the support member with good workability, while maintaining good sittability as much as possible.

Therefore, in this aspect, the support member has a sheet-shaped body that expands and contracts and supports the cushion, and a frame-shaped body that fixes the sheet-shaped body in a tensioned state. The sheet-shaped body is attached to the frame member by the frame-shaped body being engaged with the frame member. Fixing the sheet-shaped body in a tensioned state to the frame-shaped body beforehand in this way enables the work of attaching the support member to be made as simple as possible.

Furthermore, in this aspect, the frame-shaped body is rigid and maintains a shape that follows an outer shape of the frame member when the occupant is seated. Also, the frame-shaped body has a first portion where an end portion of the sheet-shaped body is fixed, and a second portion where the end portion of the sheet-shaped body is not fixed. The second portion is formed at a position that corresponds to a position where a load of the occupant concentrates, such as the rear (preferably directly under the ischium) of the occupant, when the occupant is seated. With this aspect, the frame-shaped body is rigid enough to maintain the shape, so the tensioned state of the sheet-shaped body at the first portion can be appropriately maintained (i.e., the tension of the sheet-shaped body can be kept as even as possible). Also, at the second portion (i.e., the portion that does not fix the end portion of the sheet-shaped body), the ability of the sheet-shaped body to expand and contract is relatively maintained. Thus, discomfort to the occupant can be prevented or reduced (i.e., good sittability can be maintained as much as possible) by forming the second portion in a position that corresponds to the position where the load of the occupant concentrates.

In the vehicle seat according to the aspect described above, the frame-shaped body may have a rigid rod-shaped core portion, and a resin portion arranged around the core portion. Also, the sheet-shaped body may be integrally fixed to the resin portion at the first portion. Further, the core portion may be exposed at the second portion, and a retaining portion may be provided on the exposed core portion and engage with the frame member. According to this structure, the attaching stability and the retaining force of the sheet-shaped body are improved, so the support member is able to be attached to the frame member with even better workability.

Further, a restricting portion that restricts relative movement between the core portion and the resin portion may be provided on the frame-shaped body. With this structure, relative movement between the core portion and the resin portion is restricted, so slipping of the sheet-shaped body with respect to the frame-shaped body and the like can be prevented or reduced, even if the core portion separates from the resin portion. Therefore, good sittability can be even more reliably maintained.

According to this aspect, the support member is able to be attached to the frame member with good workability, while maintaining good sittability as much as possible.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an example embodiment of the invention will be described with reference to FIGS. 1 to 6. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat. A vehicle seat 2 in FIG. 1 has a seat cushion 4, a seat back 6, a headrest 8 (all of which are examples of seat structure members), and a rail member 9. Each of these seat structure members has a frame member (4F, 6F, and 8F) that forms a seat frame, a cushion (4P, 6P, and 8P) that forms the outer shape of the seat, and cover material (4S, 6S and 8S) that covers the cushion.

Figure 1:
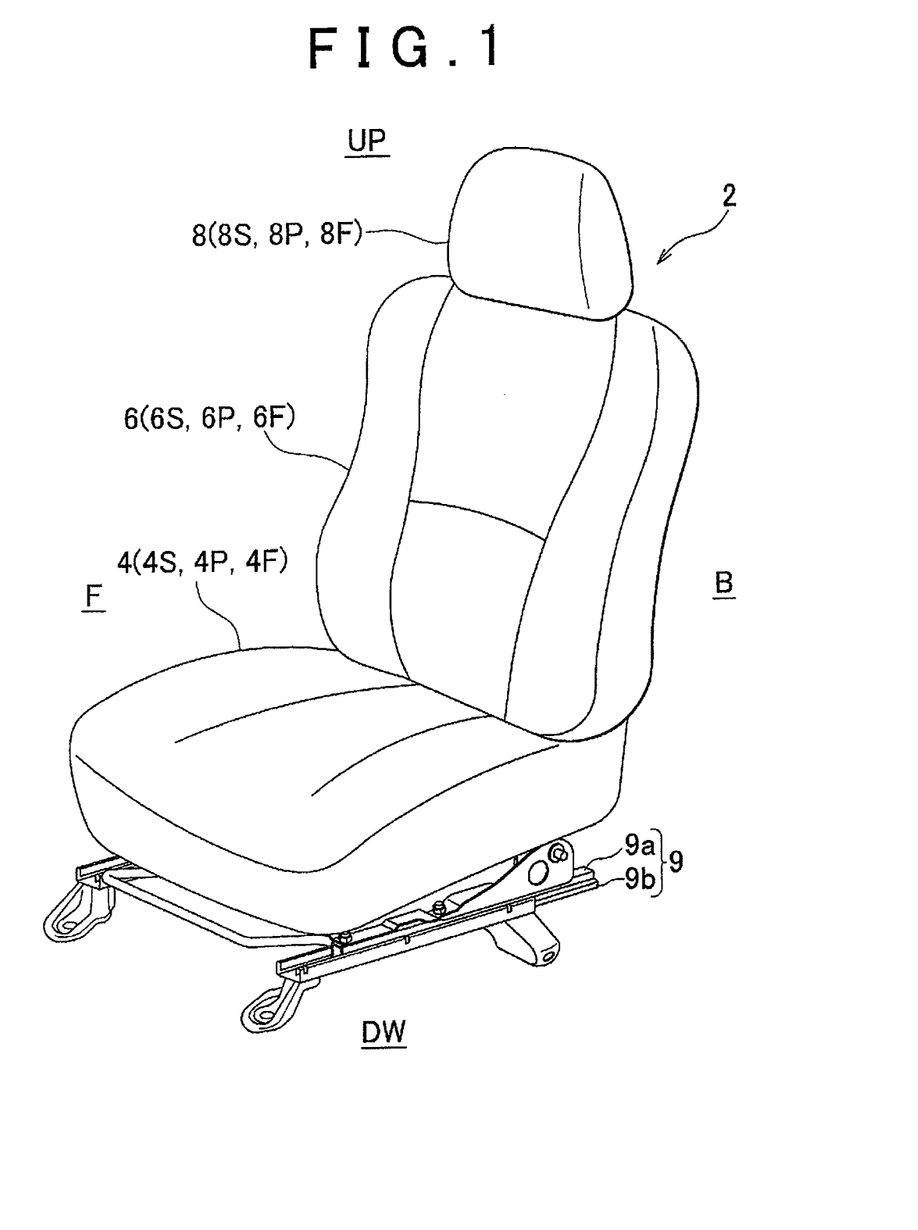
FIG. 1 is a perspective view of a vehicle seat.

Also, the rail member 9 is a member that slides the vehicle seat 2 in the longitudinal direction of the vehicle, and includes an upper rail 9a and a lower rail 9b (see FIG. 1). The lower rail 9b is a generally U-shaped (in a longitudinal sectional view) member that extends in the longitudinal direction of the seat, and is able to be arranged on a floor in a vehicle cabin. The upper rail 9a is a generally inverted U-shaped (in a longitudinal sectional view) member that extends in the longitudinal direction of the seat, and is able to be slidably assembled to the lower rail 9b. In this example embodiment, the frame member 4F is mounted to the upper portion of the upper rail 9a. In this way, the upper rail 9a (i.e., the vehicle seat 2) slides in the longitudinal direction of the vehicle with respect to the lower rail 9b.

The seat cushion 4 has a basic structure (4F, 4P, and 4S), and a support member 20 that will be described later (see FIGS. 1 and 2; the members will be described in detail later). In this example embodiment, the cushion 4P is attached to the frame member 4F via the support member 20. With this kind of seat structure, it is preferable that the support member 20 be able to be attached to the frame member 4F with good workability while maintaining good sittability. Thus, in this example embodiment, the support member 20 is attached to the frame member 4F with good workability while maintaining good sittability, according to structures that will be described later. Each of the structures will now be described in detail.

The cover material 4S is bag-shaped material that covers the cushion 4P and may be made of fabric (woven, knit, or nonwoven), natural leather, or synthetic leather, for example. Also, the cushion 4P forms the contour (i.e., the outer shape) of the seat, i.e., is generally rectangular. The cushion 4P is a member that elastically supports an occupant and may be made of resin material such as polyurethane foam, for example.

Figure 2:
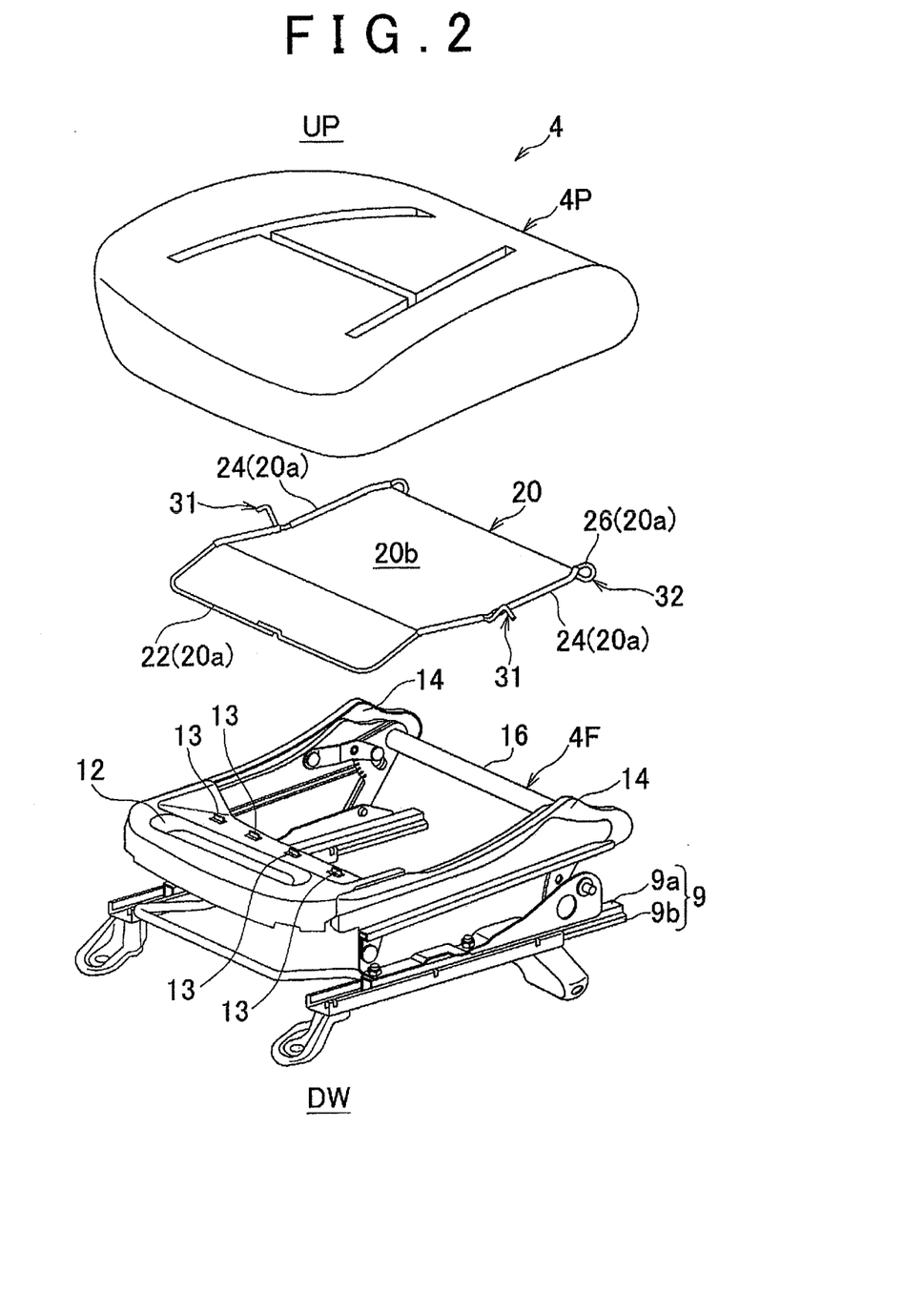
FIG. 2 is an exploded perspective view of a portion of a seat cushion.

Also, the frame member 4F includes a front frame 12, pair of side frames 14, and a rear frame 16 (see FIG. 2). The front frame 12 is a flat plate-shaped member that forms the front portion of the seat cushion 4, and has a plurality of pawl portions 13. These pawl portions 13 are members that are generally sideways L-shaped (in a side view) members that retain a frame-shaped body 20a that will be described later. In this example embodiment, the plurality of pawl portions 13 are formed protruding on an upper surface (i.e., a slanted surface) of the front frame 12. Also, the pair of side frames 14 are flat plate-shaped members that form the side portions of the seat cushion 4. These side frames 14 are arranged facing each other on the sides of the seat. The rear frame 16 is a rod-shaped member that reinforces the rear portion of the frame member 4F, and is arranged bridging the space between the two side frames 14.

Figure 3:
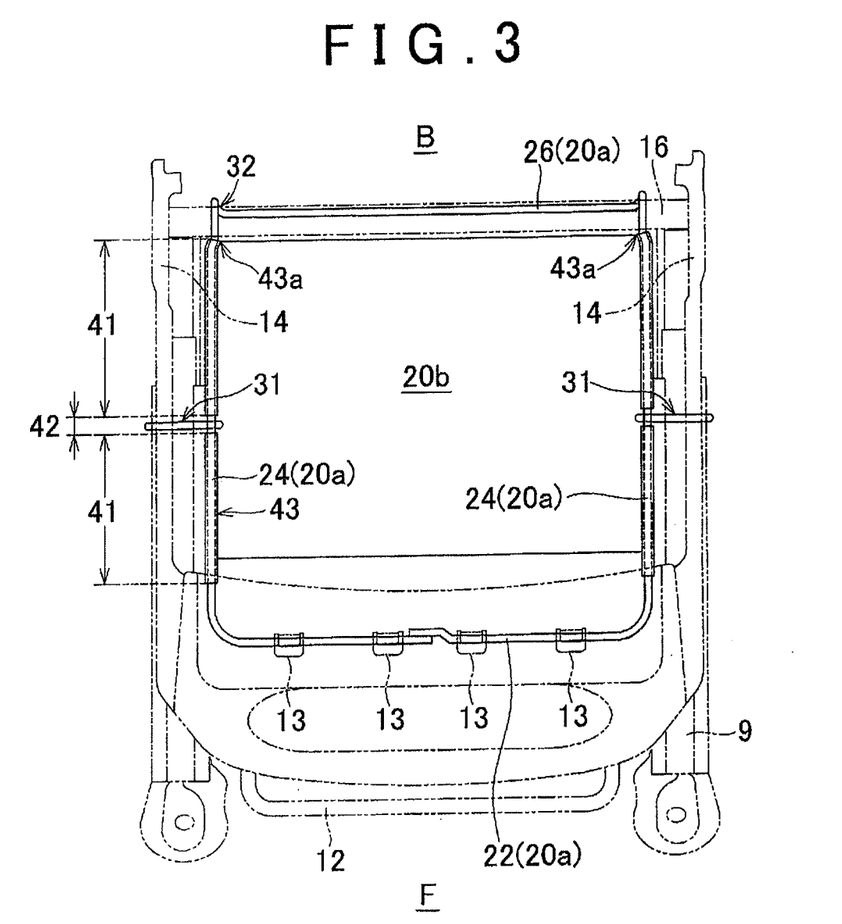
FIG. 3 is a plan view of a support member.
Figure 4:
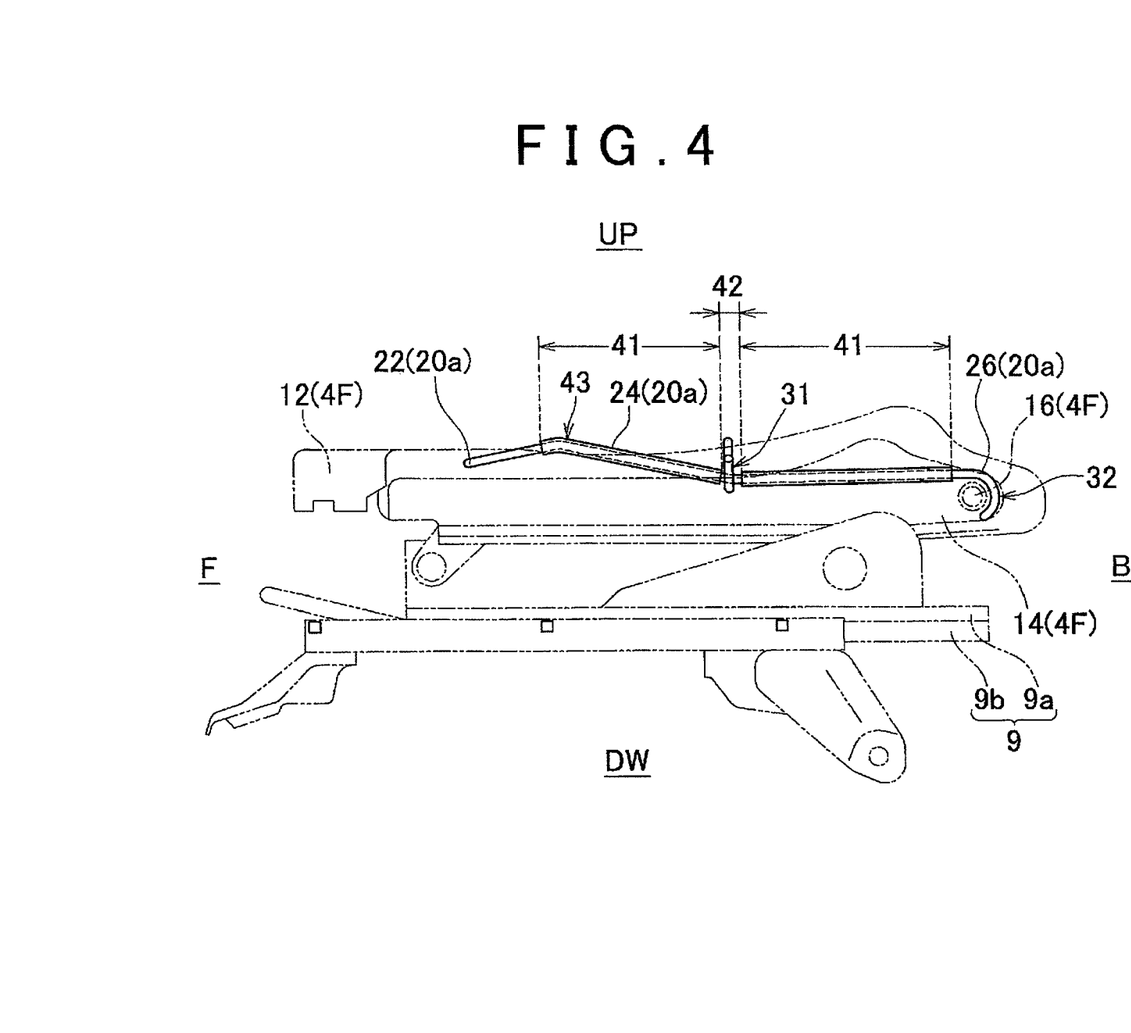
FIG. 4 is a side view of the support member.

The support member 20 is a member that supports the cushion 4P on the frame member 4F, and includes a frame-shaped body 20a, a sheet-shaped body 20b, and retaining portions 31 and 32 (see FIGS. 2 to 4). The frame-shaped body 20a includes a first portion 41, a second portion 42, and a plurality of restricting portions 43 and 43a, all of which will be described later.

The sheet-shaped body 20b is a member (such as a single sheet-shaped member) can expand and contract and supports the cushion 4P (see FIG. 2). Here, the type of sheet-shaped body 20b is not particularly limited, and may be fabric (woven, knit, or nonwoven), leather (natural leather or synthetic leather), or a net body (i.e., a member in which fibers are woven into a mesh). The sheet-shaped body 20b in this example embodiment is made of a single layer of fabric, and may be attached inside the hollow frame-shaped body 20a that will be described later (see FIGS. 2 and 5).

The frame-shaped body 20a is a member that fixes the sheet-shaped body 20b in a tensioned state (see FIGS. 2 to 4). This frame-shaped body 20a has a shape (generally rectangular in this example embodiment) that follows the outer shape of the frame member 4F when an occupant is seated. The frame-shaped body 20a in this example embodiment has slightly smaller dimensions than the frame member 4F and fits in the center of the frame member 4F. Also, the frame-shaped body 20a in this example embodiment is a frame-shaped member with a hollow center, and includes a front frame portion 22, a pair of side frame portions 24, and a rear frame portion 26. The front frame portion 22 serves as the front structure of the frame-shaped body 20a and is arranged at the front of the seat and extends in the lateral direction of the seat. Also, the rear frame portion 26 serves as the rear structure of the frame-shaped body 20a, and is arranged at the rear of the seat and extends in the lateral direction of the seat. The pair of side frame portions 24 serve as the side structures of the frame-shaped body 20a, and both extend in the longitudinal direction of the seat.

When an occupant is seated, the frame-shaped body 20a is generally rectangular and is rigid enough to maintain a shape that follows the outer shape of the frame member 4F (see FIGS. 2 and 3). In this example embodiment, the front frame portion 22 and the side frame portions 24 each have a core portion CM and a resin portion RM, and the rear frame portion 26 just has the core portion CM (see FIG. 5). The core portion CM is a rod-shaped member that has a shape that follows the outer shape of the frame member 4F. This core portion CM may be formed by hard resin or any one of various metals having the desired rigidity (such as magnesium).

Figure 5:
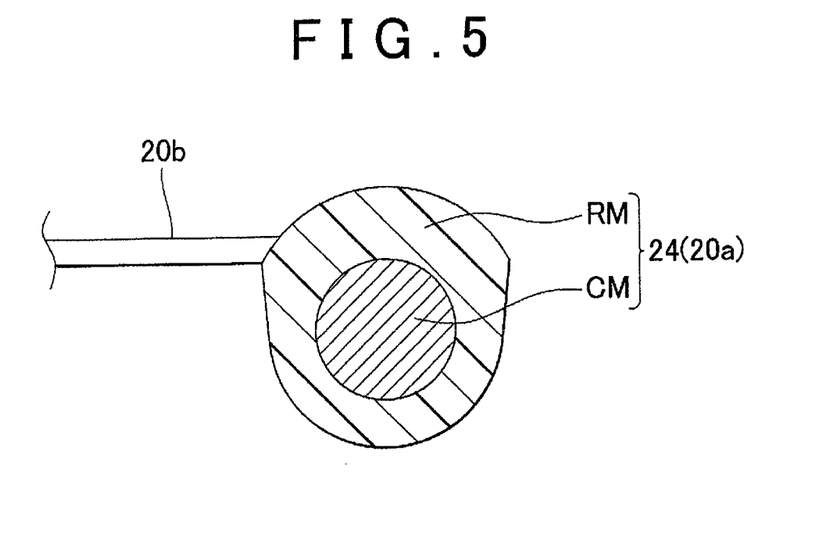
FIG. 5 is a longitudinal sectional view of a portion of the support member.
Figure 6:
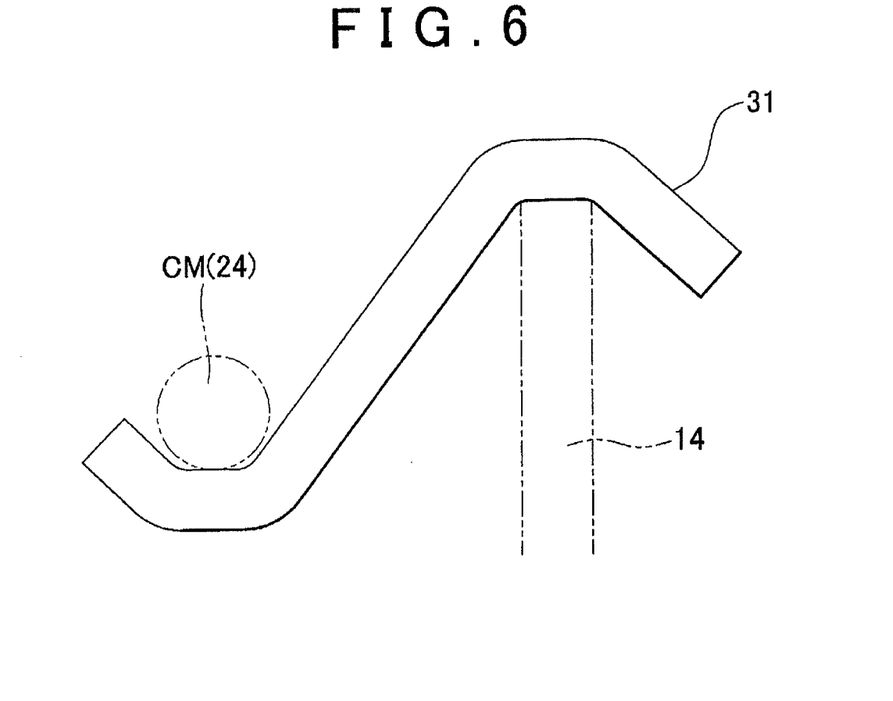
FIG. 6 is a side view of a retaining portion.

Also, the resin portion RM is a covering layer formed around the core portion CM (see FIG. 5). The material of this resin portion RM may be, for example, a thermoplastic resin (such as polypropylene, vinyl chloride resin, or polyethylene), or a thermosetting resin (such as phenolic resin, melamine resin, epoxy resin, or urea resin). Here, maleic modified polypropylene easily blends with various metals (such as magnesium) and does not easily separate from various metals. Therefore, in this example embodiment, the resin portion RM is preferably made of maleic modified polypropylene.

In this example embodiment, the first portion 41 and the second portion 42 may be formed on each of the side frame portions 24 (see FIGS. 3 and 4). The first portion 41 is a portion where an end portion of the sheet-shaped body 20b is fixed. At the first portion 41, the sheet-shaped body 20b is maintained under appropriate tension by the frame-shaped body 20a (i.e., a rigid member). In this example embodiment, the first portion 41 is formed on both a front portion and a rear portion of each side frame portions 24. That is, the second portion 42 is formed between the first portion 41 of the front portion and the first portion 41 of the rear portion on each side.

Also, at the second portion 42, the side frame portion 24 is not fixed to the end portion of the sheet-shaped body 20*b*. That is, the end portion of the sheet-shaped body 20*b* is arranged so that it is free (i.e., unfixed) at the second portion 42, so the ability of the sheet-shaped body 20*b* to expand and contract. (in the vertical direction of the seat, for example) is relatively Maintained at the second portion 42. Also, in this example embodiment, the second portion 42 is formed at a position corresponding to the location that abuts against a seated occupant, such as the rear (directly below the ischium) of a seated occupant, for example. As a result, the ability of the sheet-shaped body 20*b* to expand and contract at the second portion 42 (i.e., right below the ischium) able to be appropriately maintained. Incidentally, at the second portion 42 in this example embodiment, the resin portion RM is not formed around the core portion CM, so the core portion CM here is exposed.

The frame-shaped body 20*a* has a plurality of retaining portions (i.e., first retaining portions 31, and second retaining portions 32) (see FIGS. 2 to 4). The first retaining portions 31 are generally crank-shaped members that attach to the side frame portions 24 (i.e., the second portions 42) (see FIG. 6). Here, the material of the first retaining portions 31 is not particularly limited, but it may be material that is similar to that of the core portion (i.e., rigid material), for example. In this example embodiment, one first retaining portion 31 (made of metal) attaches to each of the side frame portions 24 (also made of metal). At this time, the first retaining portions 31 are able to be relatively firmly fixed by welding or the like to the core portion CM (that is exposed) of the second portions 42 (see FIGS. 2 and 4). The first retaining portions 31 extend out to the sides of the frame-shaped body 20*a* so as to cut across the side frames 14, and are engaged with the frame member 4F. Also, the second retaining portions 32 are portions that hook onto the rear frame 16 (see FIG. 3). In this example embodiment, the rear end of each rear frame portion 26 (i.e., the core portion CM) has a generally sideways J shape (in a side view) and hooks onto the rear frame 16 (see FIG. 4).

In this example embodiment, a plurality of restricting portions (i.e., first restricting portions 43 and second restricting portions 43*a*) are provided on the side frame portions 24, and are able to restrict relative movement between the core portion CM and the resin portion RM (see FIGS. 3 and 4). The first restricting portions 43 are bent portions provided midway (toward the front) along the side frame portions 24. At these first restricting portions 43, both the core portion CM and the resin portion RM are bent so as to protrude upward, with respect to the seat, higher than the front frame portion 22 and the side frame portions 24 (toward the rear). Therefore, even if the resin portion RM peels away (or separates) from the core portion CM, resin portion RM is restricted from moving with respect to the core portion CM by the first restricting portions 43. As a result, even if the core portion CM separates from the resin portion RM, slipping of the sheet-shaped body 20*b* with respect to the frame-shaped body 20*a* and the like can be prevented or reduced. Furthermore, in this example embodiment, the side frame portions 24 slant downward, with respect to the seat, from the first restricting portions 43 to the second portions 42 (i.e., have shapes that follow the slope of the rear (i.e., the buttocks) of the occupant). Therefore, at the positions of the second portions 42, pressure on the rear of the occupant can be relieved, so the seat structure provides even better sittability. Also, the second restricting portions 43*a* are bent portions that are provided toward the rear of the side frame portions 24. At these second restricting portions 43*a*, both the core portion CM and the resin portion RM are bent so as to protrude inward with respect to the seat. In this example embodiment, separation of the core portion CM from the resin portion RM can be more reliably prevented or reduced by providing this pair of second restricting portions 43*a* on the side frame portions 24.

Here, the manufacturing method of the support member 20 is not particularly limited. For example, in this example embodiment, when forming the resin portion RM of the frame-shaped body 20*a*, the core portion CM is arranged inside a cavity of a forming die, for example. Then forming raw material (such as molten resin) is poured into the forming die and the resin portion RM is formed around the core portion CM. That is, these members, i.e., the core portion CM and the resin portion RM, are integrated. Moreover, in this example embodiment, when forming the resin portion RM of the frame-shaped body 20*a*, the sheet-shaped body 20*b* can be stretched out (i.e., placed under tension) inside the cavity of the forming die, for example. Then when the forming raw material (such as molten resin) is poured into the forming die, the sheet-shaped body 20*b* becomes integrally attached while forming the frame-shaped body 20*a*. The frame-shaped body 20*a* is integrated with the sheet-shaped body 20*b* at this time by the resin of the frame-shaped body 20*a* getting into the edge portion of the sheet-shaped body 20*b* and hardening. In the manufacturing process described above, the first portions 41 and the second portions 42 are able to be formed relatively easily on the frame-shaped body 20*a* by setting the cavity shape appropriately.

Referring to FIG. 2, the cushion 4P is attached to the frame member 4F via the support member 20. At this time, in this example embodiment, the first retaining portions 31 hook onto the side frame portions 24 while the frame-shaped body 20*a* is arranged inside the frame member 4F (see FIGS. 3 and 4). Then the support member 20 is able to be attached to the frame member 4F by inserting the front frame portion 22 into the pawl portions 13 and hooking the rear frame portion 26 (i.e., the second retaining portions 32) onto the rear frame 16. Here, in this example embodiment, the sheet-shaped body 20*b* is fixed to the frame-shaped body 20*a* in a tensioned state (at even tension) beforehand. Therefore, the hassle of tensioning the sheet-shaped body 20*b* can be omitted in this operation. Also, the cushion 4P can be arranged on the frame member 4F via the support member 20 by arranging the cushion 4P on the support member 20.

When an occupant is seated, the tension of the sheet-shaped body 20*b* at the first portions 41 can be appropriately maintained by the frame-shaped body 20*a* (that is a rigid member) (see FIGS. 3 and 4). Also, the ability of the sheet-shaped body 20*b* to expand and contract is relatively maintained at the second portions 42 (i.e., portions that do not fix the end portion of the sheet-shaped body 20*b*). Therefore, the sheet-shaped body 20*b* of the second portions 42 is able to expand and contract relatively freely in response to pushing forces from the rear (i.e., the buttocks) of an occupant and the like. As a result, excessive tension in the sheet-shaped body 20*b* from the occupant sitting down can be suitably prevented, so the occupant is able to be as comfortable as possible.

As described above, in this example embodiment, the frame-shaped body 20*a* is rigid, so the tension of the sheet-shaped body 20*b* at the first portions 41 can be appropriately maintained (i.e., the tension of the sheet-shaped body 20*b* can be kept as even as possible). Also in this example embodiment, discomfort can be prevented or reduced by forming the second portions 42 in positions that correspond to the location that abuts against the seated occupant (i.e., in positions that correspond to position where the load of the occupant concentrates). That is, good sittability can be maintained as much as possible. Also, in this example embodiment, the sheet-shaped body 20*b* is integrally fixed to the resin portion RM, so the retaining force of the sheet-shaped body 20*b* is excellent. Therefore, with this example embodiment, the support member 20 can be attached to the frame member 4F with good workability, while maintaining good sittability as much as possible.

The vehicle seat of this example embodiment is not limited to the example embodiment described above. That is, other various example embodiments are also possible. For example, in the example embodiment, the seat cushion 4 is given as an example of a seat structure member, but the structure of the example embodiment may be applied to any of a variety of seat structure members, such as a seat back. Incidentally, with a seat back, discomfort to the occupant may be prevented or reduced by forming the second portion in a position corresponding to the spine or the lower back (examples of positions where the load of the occupant concentrates) of the occupant.

Also, in the example embodiment, the mid portions of the side frame portions 24 that are bent upward with respect to the seat are examples of the first restricting portions 43. Alternatively, however, the mid portions of the side frame portions 24 may also be bent downward or to the sides with respect to the seat. Also, resin may also filled into a hole or a groove provided in the core portion and then hardened, and this may serve as the restricting portion. Further, the second restricting portions 43*a* may also be formed midway along the side frame portions 24 or toward the front of the side frame portions 24. Moreover, the second restricting portions 43*a* may also be bent toward the outside of the seat. Incidentally, in this example embodiment, at least one of the first restricting portions 43 or the second restricting portions 43*a* may be formed on the side frame portions 24.

Also, the shape of the support member 20 in this example embodiment is only an example, and may be modified as appropriate according to the shapes of the frame member 4F and the cushion 4P, and the like. Further, the, structure of the retaining portions in this example embodiment is only an example, and may be modified as appropriate according to the shapes of other members, and the like. Incidentally, in this example embodiment, retaining portions that are separate from the core portion are used. Alternatively, however, retaining portions that are integrated with the core portion may be used. For example, a portion (i.e., a retaining portion) in which the core portion of the second portion has been deformed by being bent toward the side of the seat may be used.

What is claimed is:

1. A vehicle seat comprising:
a seat structure member having a frame member that forms a seat frame;
a cushion that forms a seat outer shape and elastically supports an occupant; and
a support member that attaches the cushion to the frame member, wherein
the support member has a sheet-shaped body that expands and contracts and supports the cushion, and a frame-shaped body that fixes the sheet-shaped body in a tensioned state,
the sheet-shaped body is attached to the frame member by the frame-shaped body being engaged with the frame member,
the frame-shaped body is rigid and maintains a shape that follows an outer shape of the frame member when the occupant is seated, and has a first portion where an end portion of the sheet-shaped body is fixed, and a second portion where the end portion of the sheet-shaped body is not fixed,
the second portion is formed at a position that corresponds to a position where a load of the occupant concentrates when the occupant is seated,
the frame-shaped body has a rigid rod-shaped core portion, and a resin portion arranged around the core portion,
the sheet-shaped body is integrally fixed to the resin portion at the first portion,
the core portion is exposed at the second portion, and
a retaining portion is provided on the exposed core portion and engages with the frame member.

2. The vehicle seat according to claim 1, wherein the first portion and the second portion are formed on each of side frame portions and each of the side frame portions is a side structure of the frame-shaped body which extends in the longitudinal direction of the vehicle seat.

3. The vehicle seat according to claim 2, wherein the first portion is formed at both a front portion and a rear portion of the side frame portion of the frame-shaped body; and
the second portion is formed between the first portion of the front portion and the first portion of the rear portion.

4. The vehicle seat according to claim 1, wherein the seat structure member includes a seat cushion or a seat back.

5. The vehicle seat according to claim 1, wherein a restricting portion that restricts relative movement between the core portion and the resin portion is provided on the frame-shaped body.

6. The vehicle seat according to claim 5, wherein the restricting portion is a bent portion formed on the frame-shaped body.

* * * * *